(12) United States Patent
Ammar

(10) Patent No.: US 7,804,442 B2
(45) Date of Patent: Sep. 28, 2010

(54) MILLIMETER WAVE (MMW) SCREENING PORTAL SYSTEMS, DEVICES AND METHODS

(75) Inventor: Danny F. Ammar, Windermere, FL (US)

(73) Assignee: Reveal Imaging, LLC, Bedford, MA (US)

( * ) Notice: Subject to any disclaimer, the term of this patent is extended or adjusted under 35 U.S.C. 154(b) by 340 days.

(21) Appl. No.: 12/019,401

(22) Filed: Jan. 24, 2008

(65) Prior Publication Data

US 2009/0073023 A1 Mar. 19, 2009

(51) Int. Cl.
*H01Q 17/00* (2006.01)
*G01S 13/00* (2006.01)

(52) U.S. Cl. ............... 342/22; 342/5; 342/27; 342/179

(58) Field of Classification Search ............ 342/5–11, 342/22, 27, 28, 176, 179, 182, 183
See application file for complete search history.

(56) References Cited

U.S. PATENT DOCUMENTS

| | | | | |
|---|---|---|---|---|
| 3,713,156 | A * | 1/1973 | Pothier | 342/22 |
| 6,480,141 | B1 * | 11/2002 | Toth et al. | 342/22 |
| 6,777,684 | B1 * | 8/2004 | Volkov et al. | 250/341.1 |
| 6,937,182 | B2 * | 8/2005 | Lovberg et al. | 342/22 |
| 7,119,740 | B2 * | 10/2006 | Blasing et al. | 342/179 |
| 7,194,236 | B2 * | 3/2007 | Lovberg et al. | 455/25 |
| 7,212,153 | B2 * | 5/2007 | Rowe et al. | 342/179 |
| 7,253,766 | B2 * | 8/2007 | Foote et al. | 342/22 |
| 7,365,672 | B2 * | 4/2008 | Keller et al. | 342/22 |
| 7,405,692 | B2 * | 7/2008 | McMakin et al. | 342/22 |
| 7,415,244 | B2 * | 8/2008 | Kolinko et al. | 455/25 |
| 2004/0080315 | A1 * | 4/2004 | Beevor et al. | 324/244 |
| 2005/0093733 | A1 * | 5/2005 | Lovberg et al. | 342/22 |
| 2005/0110672 | A1 * | 5/2005 | Cardiasmenos et al. | 342/27 |
| 2006/0017605 | A1 * | 1/2006 | Lovberg et al. | 342/22 |
| 2006/0098773 | A1 * | 5/2006 | Peschmann | 378/57 |
| 2007/0086624 | A1 * | 4/2007 | Breed et al. | 382/104 |

OTHER PUBLICATIONS

Three-dimensional millimeter-wave imaging for concealed weapon detection Sheen, D.M.; McMakin, D.L.; Hall, T.E.; Microwave Theory and Techniques, IEEE Transactions on vol. 49, Issue 9, Sep. 2001 pp. 1581-1592.*

* cited by examiner

*Primary Examiner*—Thomas H Tarcza
*Assistant Examiner*—Peter M Bythrow
(74) *Attorney, Agent, or Firm*—David F. Crosby; T. J. Clark; Mintz Levin Cohn Ferris Glovsky and Popeo P.C.

(57) ABSTRACT

A millimeter-wave (MMW) based screening system is provided that may operate with an active sensor, a passive sensor, or in a dual mode using both the active and passive sensors. One or more such sensors are mounted so as to rotate along an axis that passes through a target region of detection, in which a person or object is positioned for screening. A reflector is disposed radially outward from the one or more rotating sensors to reflect MMW radiation between the sensors and the target region. The system may be employed as a portal screening system, and may include a structure having a wall and a roof, for rapidly screening persons for concealed objects. Algorithms may be employed to provide data output that avoids privacy issues.

10 Claims, 7 Drawing Sheets

MILLIMETER WAVE (MMW) SCREENING PORTAL SYSTEMS, DEVICES AND METHODS

FIELD OF THE INVENTION

This invention relates to screening systems, devices and methods used in security, and more particularly, to millimeter wave screening systems, devices and methods.

BACKGROUND OF THE INVENTION

Concealed objects detection is a challenge facing the law enforcement community today and requires more than metal detectors in the high security environment now required. There must be reliable techniques to detect and identify non-metallic objects or other threatening objects that may be concealed under clothing.

People screening for objects and explosives is an estimated $8 billion market by the year 2008 (Source: Homeland Security Research Corporation). A recent report by Research and Markets estimates the cost of screening a single person is between $4 and $5. The estimated queuing time at airport checkpoints in the U.S. is now over 20 min. During peak hours the queuing time is much larger and lines of waiting passengers snake inside and outside the airport.

It is quite clear screening people with metal detectors prior to entering secured areas is ineffective in preventing some objects from getting through. It is nearly an impossible task to achieve 100% success given the tools screeners have available today.

BRIEF DESCRIPTION OF THE DRAWINGS

Other objects, features and advantages of the present invention will become apparent from the detailed description of the invention, which follows when considered in light of the accompanying drawings in which:

FIG. 3A provides a perspective view showing a portal screening device of a portal screening system in accordance with a non-limiting example of the present invention.

FIG. 3B provides a perspective view of a remote computer station associated with the portal screening device in FIG. 3A.

FIG. 3C provides an exemplary view of data output on a display monitor of the remote computer station of FIG. 3B.

DETAILED DESCRIPTION OF THE EMBODIMENTS OF THE INVENTION

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
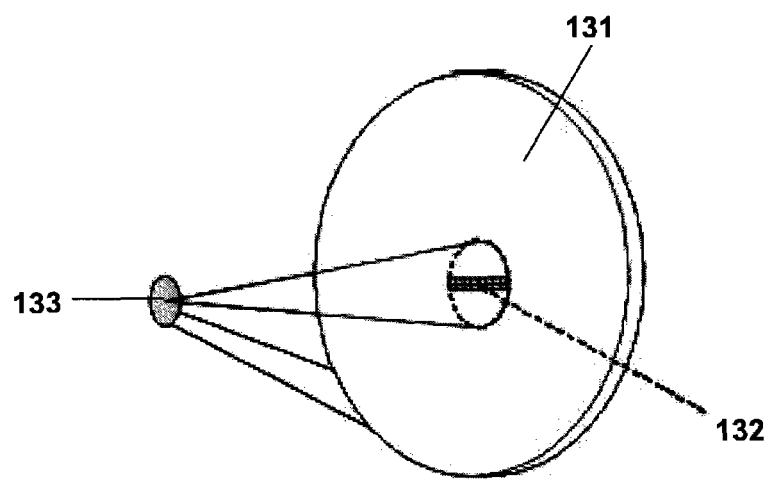
FIG. 1 is an environmental view of a passive millimeter wave focal plane array.

MMW based screening systems are now starting to emerge. There are basically 2 types of systems: Passive and active. Passive systems simply observe and report whatever they detect in their local environment. In the RF spectral range, natural surfaces will emit different amounts of radiation depending on parameters such as temperature and emissivity. In addition, metals are strongly reflective in RF, which reduces a metal surface's emissivity and allows it to produce reflections of other sources in the scene with the most significant being the sky. From a people screening point of view, passive sensors have the great advantage of producing valuable information without emitting any signals of their own. Many such systems have been developed in the last few years. These systems typically employ one or more sensors in a focal plane array as shown in FIG. 1. Millimeter wave (MMW) focal plane array radiometers have been used in many applications, such as remote sensing, to form images based on detection of naturally radiated microwave energy. The images are collected by scanning the antenna reflector in one or 2 dimensions. There are many variations of focal plane arrays including those with folded mirrors (sub-reflectors) of reduced relative size (see, for example, FIG. 1 which comprises an antenna 131 comprising a centered sensor array 132 and a spaced apart sub-reflector 133 that concentrates radiation from the concave antenna 131 onto the sensor array 132), and others with corrective lenses to better focus the energy on the sensor array. The principle of operation of focal plane array techniques is fully described in the literature. Herring et al. (U.S. Pat. No. 6,144,031) teaches an Infrared focal plane array system. Although the system is operating at Infrared frequencies, the general principles are the same at MMW frequencies.

Figure 2:
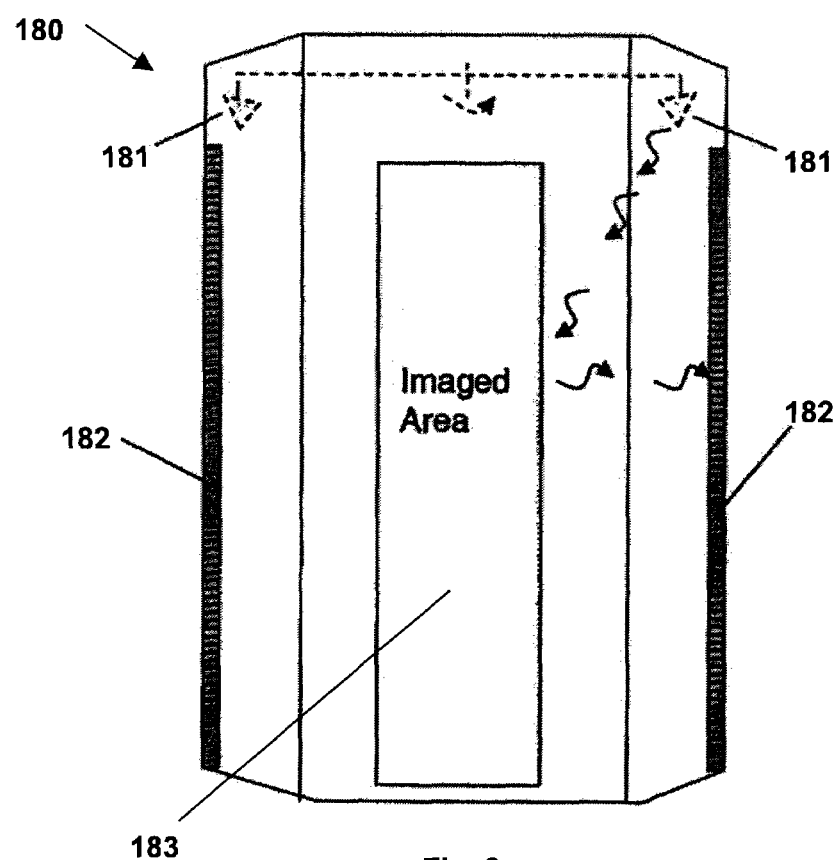
FIG. 2 is a fragmentary environmental view showing an active portal.

Active systems, on the other hand, typically stimulate the environment by generating and emitting known signals. These signals propagate out to the objects or targets of interest, interact with them, and reflect or scatter energy back to the sensor. Because the self-generated signals have known properties, it is often possible to use signal processing to extract very weak emitted target signals from competing sources of noise. FIG. 2 shows a typical portal 180, which uses active MMW for screening. The system consists of one or more rotating transmitters 181 on the top of the portal and one or more receiver arrays 181 on the side to detect the energy bouncing off the screened or imaged area 183. The screened area is typically a cylindrical shape area where the screened subject is standing. This system as been successfully demonstrated to generate high resolution images. The major drawback of such a system is the high cost associated with the large array of receivers and switching networks needed to create the MMW images.

The primary issues with existing passive MMW focal plane cameras are their limited angular coverage. Multiple (at least 3 cameras) will be needed to screen the subject from 360 degrees. In addition, unless the systems are networked together, there is a possibility for some missed information at the transition points.

Existing active portals may deliver high quality images, but they are very expensive and still have the lingering issue of privacy due to operator viewing of the images. In addition, each portal requires at least two operators and takes multiple seconds to scan a person.

This patent defines a system which quickly identifies concealed objects, including plastic explosives and other types of objects. In various embodiments a device of the invention may comprise, and a system of the invention may utilize: only passive millimeter wave sensor(s) (i.e., one or more); only active millimeter wave sensor(s) (i.e., one or more); or both active and passive millimeter wave sensor(s) (i.e., one or more of each). The latter is referred to as 'dual mode.' Accordingly, the active, passive or dual mode millimeter-wave system rapidly scans people, sending reflected signals into a high-speed image processor to produce a high-resolution 3-D image. In various embodiments the imaging technology can produce an image in less than a second. For example, and not to be limiting, as described in Xytrans U.S. Pat. No. 7,002,511, a fast, frequency-agile radar with built-in, real-time, digital signal processing (DSP) functionality, is capable of creating a wideband waveform of sufficient modulation rate, and detection engine with sufficient calculation capability, to complete a full 360 deg scan in less than one second, and provide pre-processed, compressed data to an imaging generation computer to enable rapid display.

The assignee has developed sensors and related technology that may be used in various embodiments of the present invention. Examples of such sensors and related technology are found in U.S. Pat. Nos. 7,239,122, 7,221,139, 7,199,570, 7,088,086, and 7,034,516. These patents are incorporated by reference for their teachings, some of which teach a high level of design integration that may be achieved for the passive or dual mode portal system sensors of the present invention. Also relevant to some embodiments of the present invention are electrical (circuit) design innovations within the sensor itself that could be used to improve quality of the data gathered compared to the current art. These are described in U.S. Pat. Nos. 7,250,747 and 7,135,848.

As such, in the portal application, it may be worth referencing in terms of detection performance enhancements, further enabling a passive-only portal. Or, in terms of offsetting additional cost of a dual mode portal by describing lower cost sensor concepts in passive mode. Or, in terms of the design flexibility it brings to the portal by its enabling of very large, fixed, passive arrays encircling a subject and thus the alternative not to require a passive sensor to rotate.

More generally, device and system embodiments of the present invention can be used in a variety of public areas, such as airports, court houses, federal buildings, prisons, schools, sporting events, mass transit systems, and military checkpoints to minimize delays. The system can be used for individual screening indoors and outdoors and accurately pinpoint the location of concealed objects.

This concealed object detection system is more effective against a broader range of potentially threatening material types (i.e. metals and non-metals) than commonly used metal detectors, incorporating a safe, sensing technology with image recognition capabilities. In contrast to metal detectors that provide coarse location of objects through sound alarms and illumination of lighting along the side panels of a stand-alone device, these imaging systems provide a visual representation on a computer monitor display of where a concealed object is located directly on the body. They do this by recording contrasts between observed data collected of the body itself relative to objects situated on the body, which have a different MMW signature that the detection engine can recognize. These contrasts can be of the radiometric temperature type (passive) or of the reflected energy difference type (active). In various embodiments the system places an icon over the on-screen video image of a person, identifying the location of the concealed object. FIG. 3 shows the system concept for this portal screening system. The system uses active and/or passive MMW sensors and tomography software to perform the detection and screening functions.

Figure 3A:
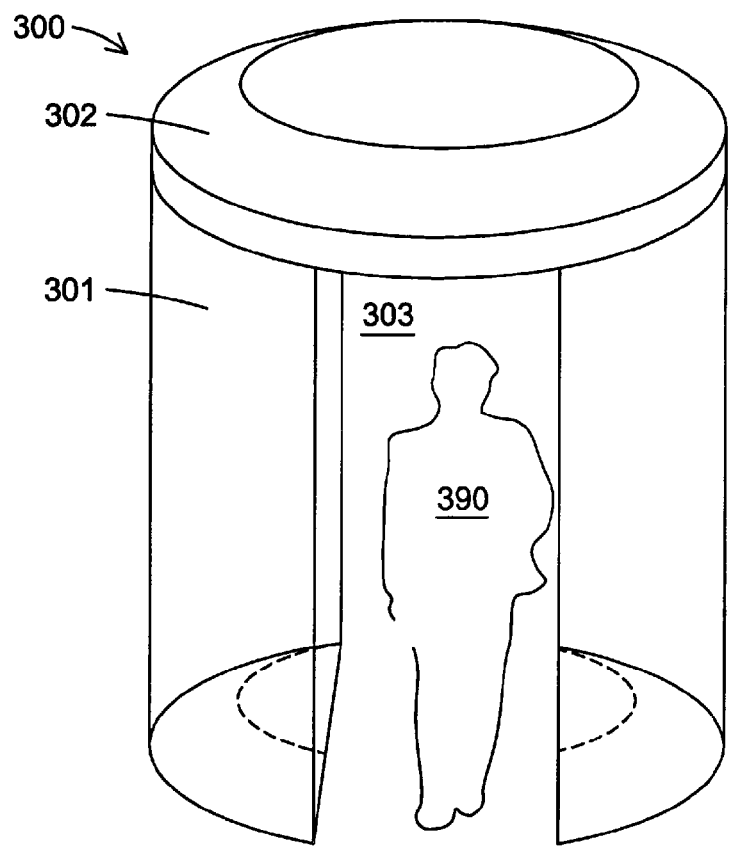
FIGS. 3A-C depict components and data output of an exemplary embodiment of the present invention.
Figure 3B:
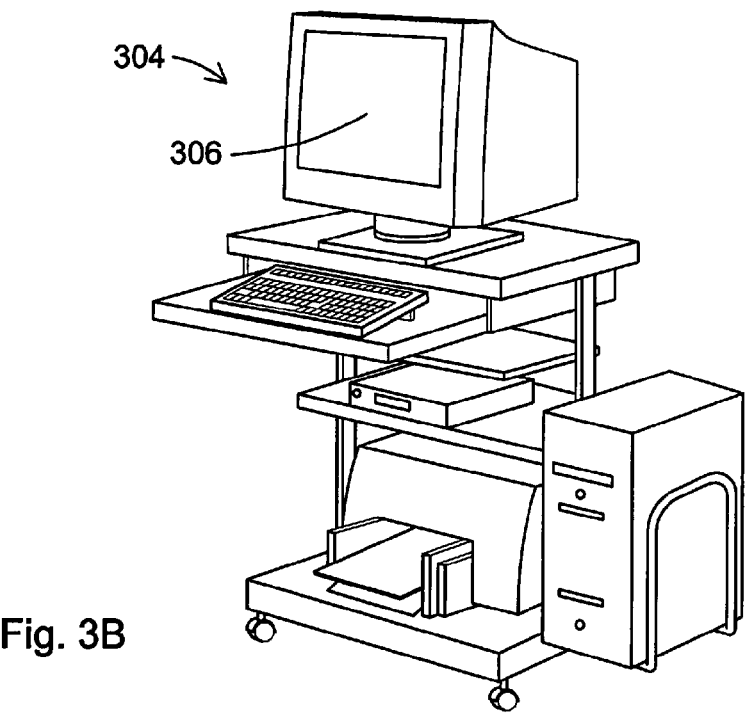
Figure 3C:
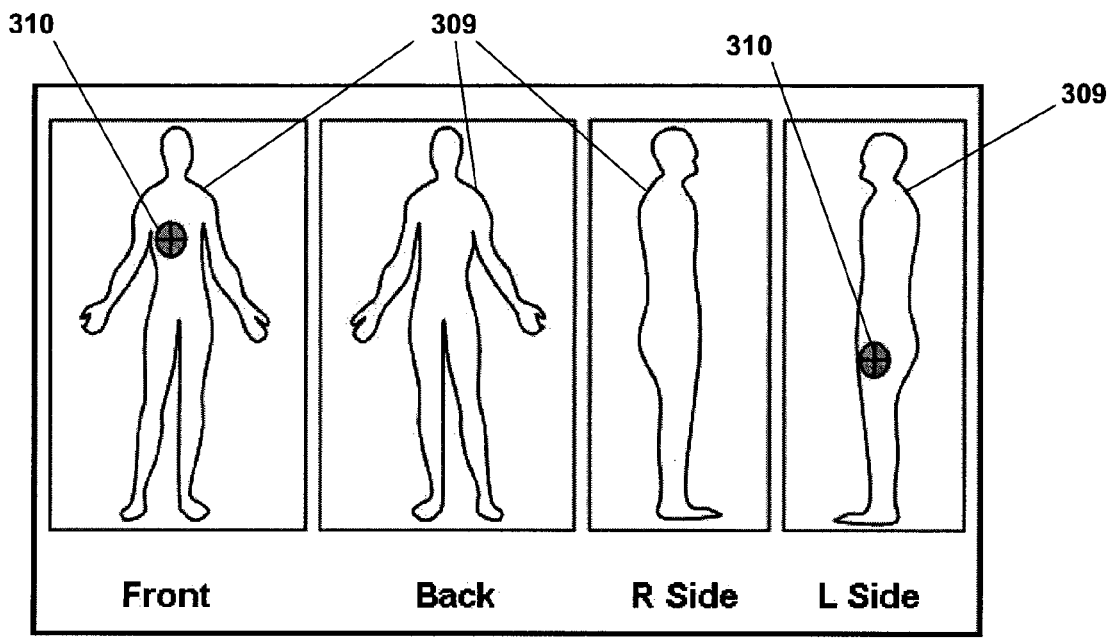

Features of an exemplary embodiment of a portal screening system of the present invention are shown in FIGS. 3A-3C. FIG. 3A provides a perspective view of a portal screening station 300, which comprises an external wall structure 301 and roof structure 302, and which is a component of a portal screening system of the present invention. A passageway 303 provides for entry and exit of a subject 390 to be screened. When the person remains stationary for a specified time in the center of the passageway 303, in a central scanning target position (see FIGS. 5B and 7), and scanning proceeds by one of the methods described herein, data is collected. The data may be sent, such as by wireless communication, e.g., rf transmission or alternatively via conventional signal cable as are known to those skilled in the art, to a display and processing terminal, here exemplified in FIG. 3B as a computer station 304. This computer station 304 comprises a computer monitor 306 and provides usable output of the processing of the MMW data. This display and processing terminal, here exemplified as the computer station 304, is shown as remote so as to provide a greater degree of safety and privacy for the operator. However, in other embodiments a display and processing terminal may not be remote from the portal screening station 300.

During operation of the depicted embodiment, a software algorithm converts the data to usable output, here comprising a plurality of body profiles 309 that do not reveal distinct images that may be considered to invade the privacy of the person being scanned. The display of body profiles 309 may include identification of the views—front, back, right side, and left side, as is shown in FIG. 3C. In various embodiments, the computer algorithm converts into an icon data that indicates the presence of a standard metallic or non-metallic objects considered a threat, including explosives and other types of objects. FIG. 3C shows an example of a screen image from scanning the subject 390 in FIG. 3A. A first icon 310 is shown in the front chest area and a second icon 310 is shown in the left hip area, indicating multiple threats from this subject 390. Appropriate security action may therefore be taken based on this screening.

The system incorporates a novel fast image generation technique that allows for the acquisition of high resolution three dimensional millimeter wave images of stationary subjects in less than a second. The active system emitted power is <0.1 milliwatts and poses no health concerns for operator or subjects. The low power operation is still sufficient to penetrate heavy clothing or material. The small system size allows for easy transport and rapid deployment of the system.

Figure 4:
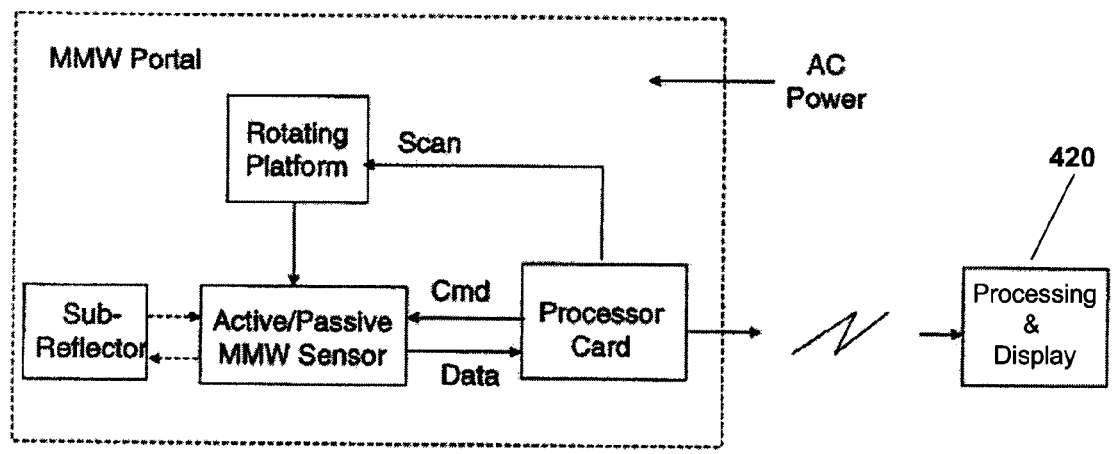
FIG. 4 is a block diagram showing a screening portal system.

A portal screening system block diagram is shown in FIG. 4. The main elements of the portal screening system are: the active and/or passive sensors (see FIG. 5A), the structure of the portal screening station (see 300 of FIG. 3A), the reflector (see FIG. 5A), the rotating platform (see FIG. 5A) and a display and processing terminal, depicted in FIG. 4 simply as a display monitor 420. A shown in FIG. 5A, a main sensor, which is mounted on the top of the portal on a rotating platform, collects data from 360 degrees around the subject. Secondary sensors may be added to the bottom for better detection of objects tucked in under arms or in shoes. The sensor data is processed in signal processor card and may be sent via a wireless link (such as 802.11) to a lap top or a desk top computer (which in various embodiments is part of the display and processing terminal), for further signal conditioning and display, or may be sent via any hard-wired electrical conduit as are known to those skilled in the art. The portal screening station can be constructed of light modular side panels that can be easily assembled and disassembled. When a wireless connection (such as 802.11) is used between the portal and the monitoring terminal, no physical connection is required.

Because of the location of the sensor relative to the subject being screened, the body will create blind areas due to MMW shadowing of the active sensor transmissions. This phenomenon is unavoidable, but it is minimized by the 360 degree scanning, which will illuminate the subjects from various azimuth directions. Also, the shadowing can be operationally controlled by placing footprints within the portal for a subject to align with, and establishing a fixed pose for the duration of the scanning, an example being arms extended at an angle outward. By enforcing such constraints, the area where the overhead sensor may be blind can be supplemented by floor or platform-level sensors that scan from below into these blind areas. The sensors are fixed in position, but in all other relevant ways gather, capture, and interpret data similar to the overhead sensor. Integration of sensor data from multiple, possibly simultaneously active sensors, is done in the image processing software. FIG. 5C provides one non-limiting example of a system with supplemental sensors.

Figure 5A:
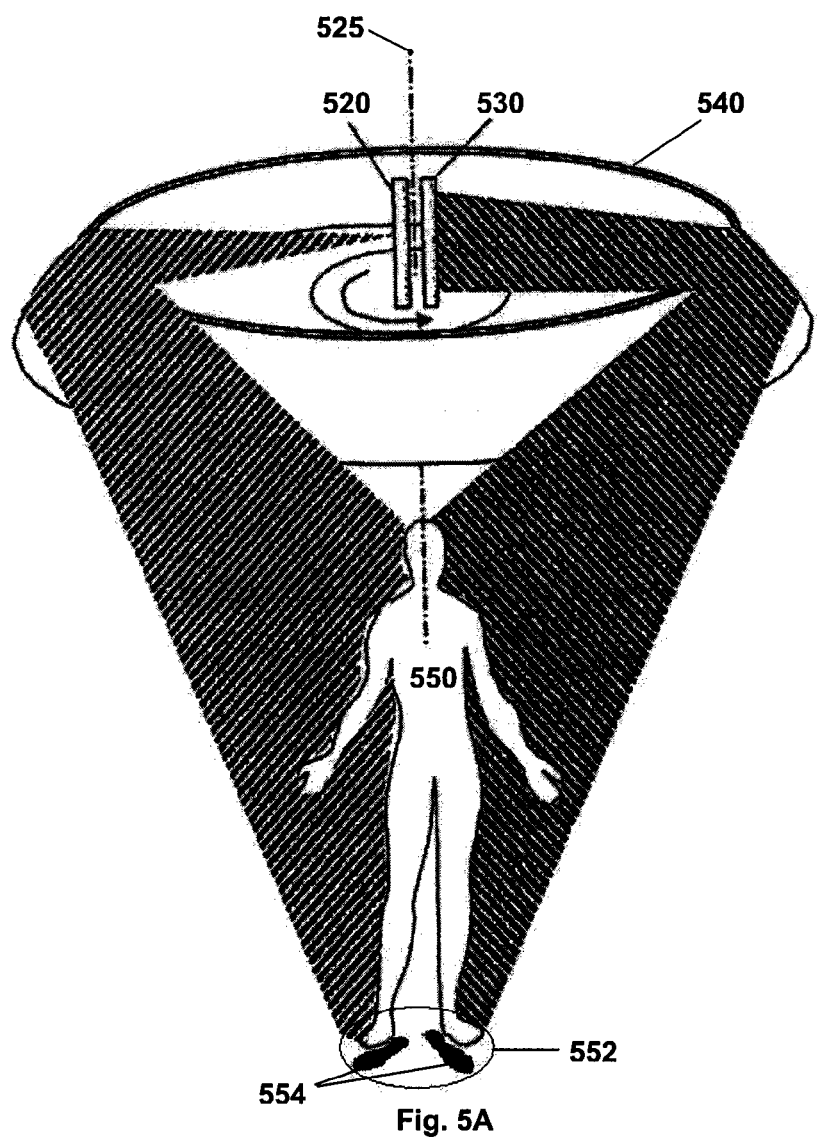
FIG. 5A provides a schematic view of components of a portal screening device of the present invention that comprises both a rotating active sensor and a rotating passive sensor.
Figure 5B:
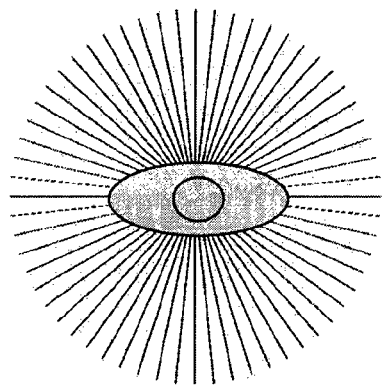
FIG. 5B is an overhead schematic depiction showing a 360 degree scanning method.
Figure 5C:
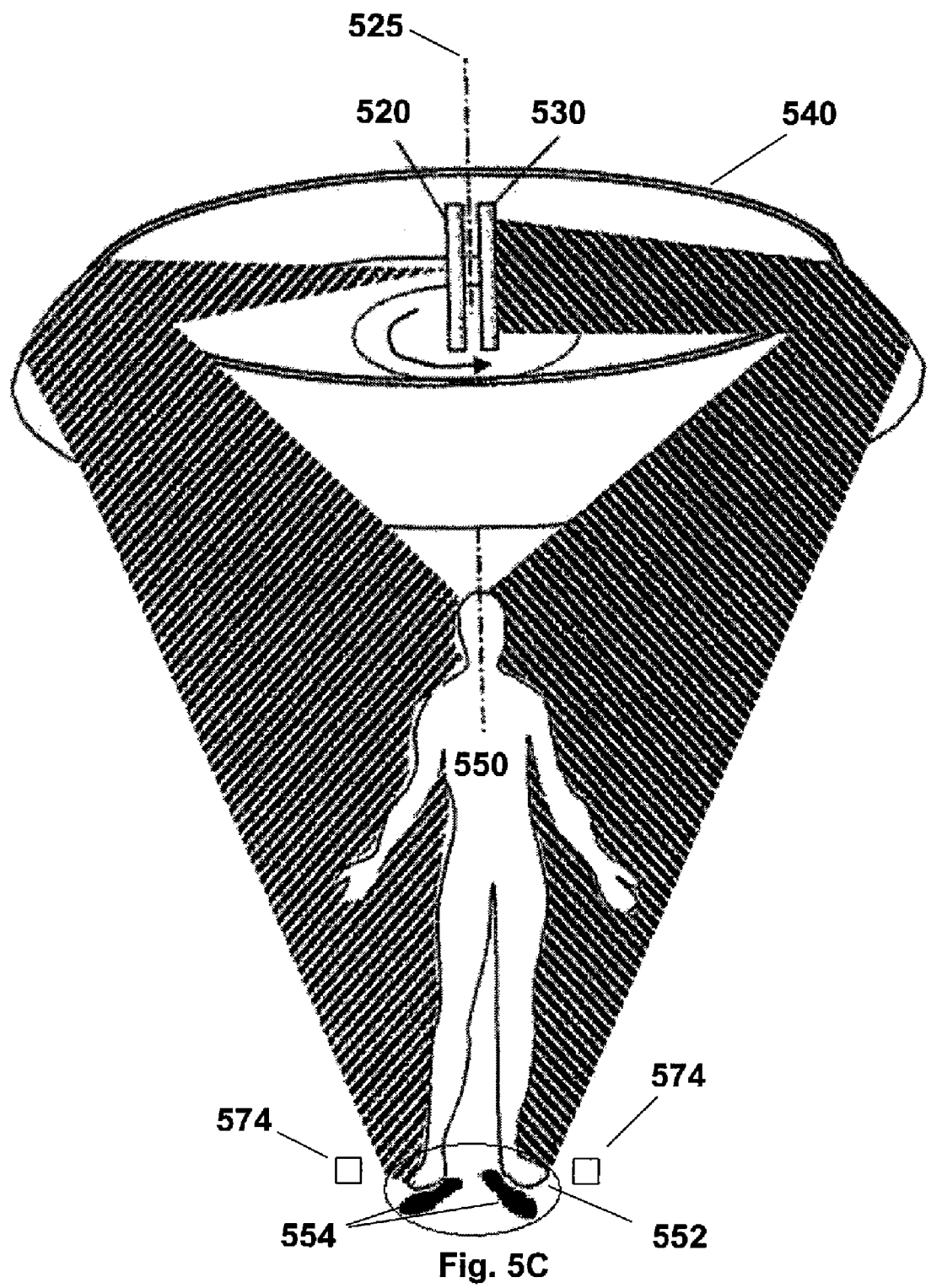
FIG. 5C provides a schematic view of components of a portal screening device of the present invention that shows both a rotatable active sensor and a rotatable passive sensor, and also shows secondary sensors.

FIGS. 5A and 5B show features and operational aspects of an exemplary device, system and method of portal scanning in accordance with the present invention. In FIG. 5A, a perspective schematic view of a portal screening system 500 of the present invention however without the external wall and roof structures (see 301 and 302 of FIG. 3A), are depicted both an active sensor 520 and a passive sensor 530. Millimeter waves reflect off an annular reflector 540 that may be disposed within the external wall and roof structures shown in FIG. 3A. A person 550 to be scanned is shown in a central position 552. In various embodiments markings, such as footprints 554, which may be located within the central position 552 so that each person 550 is instructed to place his or her feet on such markings. This may aid in obtaining desired scans more readily. Also, in various embodiments each person may be instructed to extend his or her arms to a specified position or angle, and/or to hold a handle to each side, to facilitate secondary screening as described herein.

It is noted that in various embodiments an active sensor such as 520 may comprise a single horn or antenna for signal passage while a passive sensor such as 530 may comprise multiple horns or antennas Also, in various embodiments more than one active or passive sensor may be provided and in various other embodiments there may only be one or more active sensors or one or more passive sensors.

In a particular method of the present invention, the sensors 520 and 530 are made to rotate (see arrow in FIG. 5A) about axis 525 at a designated speed (i.e., with a synchronous motor), the axis 525 also passing through the person 550, and one or both of these sensors progressively scans a 360-degree field of view and composes the imaged area. The area scanned is an aggregate of data taken as a series of finite increments that can be viewed looking down on the subject as a series of polar lines that are angularly displaced through the center. Scanning along each line is achieved by the angular movement of the sensor(s) as shown by the arrow in FIG. 5A. The azimuth position of the screened area is determined by the angular position of the sensor assembly. The vertical dimension is "sliced" into resolvable physical range increments by the radar waveform employed (active) or directly spatially via the sensor array elements (passive). An exemplary scanning pattern is shown in FIG. 5B. The scanner operates from the interaction of two independent assemblies, a scanning sensor (which may be one or both of the active sensor 520 and the passive sensor 530) and the reflector 540.

Further as to secondary sensors, FIG. 5C provides an example, not to be limiting, of an embodiment of a portal screening system of the present invention that includes secondary MMW sensors 574. These sensors 574 are positioned on the along floor-level so as to provide for appropriate signal collection (whether active or passive sensors) range so as to collect data from the underside of the arms which are not detectable by the active sensor 520 due to obstruction of the arms of the person 550. Sensors 574 may also collect data as to objects in the shoes of the person 550. The top active sensor 520 and the secondary sensors 574 will operate at the same MMW frequency band. One sensor will act as transmitter and receiver, while the second sensor will act as receiver only.

As noted above, the scanner can operate in passive, active or dual mode configuration. Passive mode of operation depends on the object's self-radiated energy (e.g., thermal) or reflected/incidental energy. As described herein, the reflector 540 determines the image resolution in azimuth and focuses the radiant energy onto a focal plane array sensor for elevation coverage. At 100 GHz, it is easy to achieve <1 inch azimuth resolution with the proposed reflector size. The passive sensor will be discussed in the next section.

For the active mode of operation such as shown as an option in FIG. 5A, the active sensor 520 transmits and receives MMW energy in a diametric-scanned fashion. The transmitter component (within active scanner 520 but not shown explicitly) illuminates objects within the scanned area. Reflected energy from objects within the field of view is collected. Again in the active case, the physical size of the reflector 540 determines the azimuth resolution. In contrast to the passive sensor 530, which uses focal plane arrays for elevation resolution, the active sensor 520 uses range profiling. A wide frequency band FMCW waveform is used to achieve about one inch resolution. The range information is extracted from the received radar data by a synchronous clocking method and by transforming the data using a fast fourier transform (FFT). The output of the FFT processing is the amplitude of the scattered signal as a function of range to the scanned object. The combination of available bandwidth at high MMW frequencies such as 60 GHz, available real-time processing power, fast image processing computing, and a compact, lightweight, frequency agile sensor provide the set of technologies necessary. These capabilities allow creation and employment of FMCW radar, used in traditional radar ranging applications, to the people screening application. The available bandwidth and close-in scanning yield high resolution capability. In various embodiments the active sensor operates at 60 GHz. This band is selected to avoid interference with the passive sensor operating at 80 to 100 GHz and to reduce interference from adjacent systems (high absorption losses at this frequency). The active sensor will be discussed in detailed in the next few sections.

The passive portal will use a variant of the W-band passive sensor developed and patented by Xytrans, Inc. Examples of such passive sensor 530 are described in the assignee's patents listed herein (U.S. Pat. Nos. 7,250,747, 7,239,122, 7,221,141, 7,221,139, 7,199,570, 7,135,848, 7,088,086), which are incorporated by reference for these teachings. The packaging approach allows for low cost implementation of a large number of channels. The channels are stacked on both sides in order to achieve two rows of radiometer cells in a very small amount of space. For example, a 32-element array can easily fit in a 7×7 inch unit. This size is meant as a non-limiting example.

In various embodiments the active portal uses a FMCW radar sensor operating at MMW frequencies. There are many significant advantages of active radar sensors as compared with passive sensors. Among those advantages are higher target detection probability and higher resolution capability.

First, we need to establish some of the fundamental relations for the resolution of an imaging system. In the down-range dimension resolution, $\Delta r$, is related to the signal bandwidth B, thus $\Delta r = c/2B$, where B is the RF bandwidth.

High resolution may be obtained either with a short-duration pulse or by a coded wide-bandwidth signal, such as a linear FM chirp or a step frequency sequence, with the appropriate pulse compression processing.

As is well known, angle resolution capability of monostatic radar is determined by the beamwidth of its antenna. Therefore, linear resolution capability in cross-range direction of a wideband radar is usually much worse than resolution capability in range. Cross-range resolution in monostatic radar is determined by the product of the range and beamwidth $\theta_B$. The beamwidth is determined by the size of the aperture d. In this case, d is primarily related to the annular reflector. Thus, cross-range (azimuth) resolution, is given by:

$$\Delta x = R\theta_B = R\lambda/d$$

Where $\Delta x$ represents the azimuthal increment resolvable, R is range to the target taken by the transmitted waveform (to the reflector and then to the subject), $\lambda$ is the wavelength at 60 GHz, and d is the antenna diameter (for a circular antenna).

As for most cases with multiple antenna elements, effective antenna size and thus resolution are determined by the reflector size. A 0.5 m reflector size at 60 GHz frequency will provide <1 inch azimuth resolution.

Figure 6:
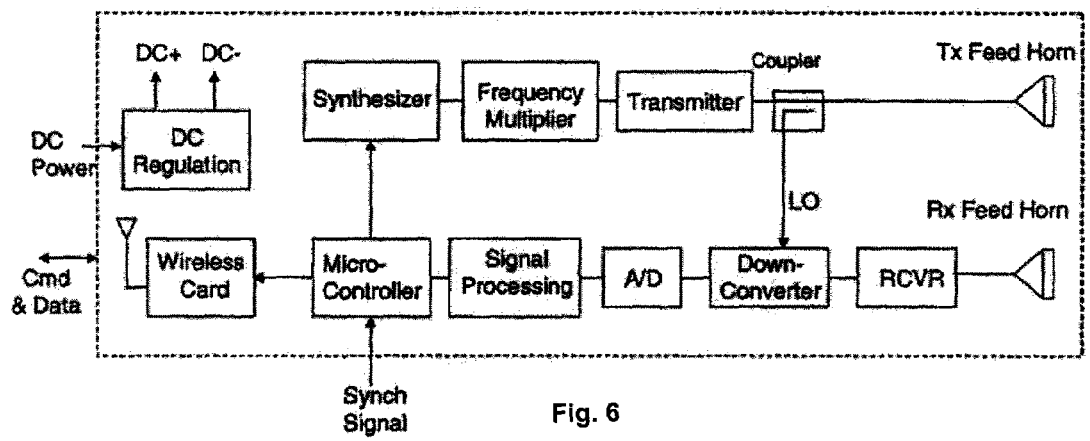
FIG. 6 is a block diagram showing an active millimeter wave Frequency Modulated Continuous Wave ("FMCW") sensor.

FIG. 6 shows a block diagram of the 60 GHz radar sensor that may be used for active scanning. The radar sensor uses a wideband (6 GHz bandwidth) FMCW waveform to achieve about 1 inch image resolution (thus the nominal 60 GHz stated frequency actually has a range from 56 to 64 GHz). The maximum radiated power will be well below 1 milliwatt, which is 1000 times lower than a cell phone power. Without being limiting, in various embodiments the sensor may be made to be very compact, such as measuring only about 3×2×1 inch or in other embodiments 4×6×1 inch. Also, in various embodiments, without being limiting, data may be transferred to a remote display and processing terminal, such as a computer, via wireless 802.11 link.

In various embodiments a radar sensor that may be used in embodiments of the present invention includes frequency synthesis, transceiver, A/D conversion, signal processing and wireless interface. The radar signals received by the sensor are digitized and processed within the unit by a high speed Field Programmable Gate Array (FPGA) processor. The system provides range and power spectra information to a remote computer via wireless interface. This high bandwidth interface allows the complete power spectra information to be acquired at the maximum sensor throughput. Sensor command and control signals are also sent from the computer to the sensor via the wireless interface. A synch pulse is used to synchronizes the sensor operation with other external devices, such as an antenna scanner or a display.

Figure 7:
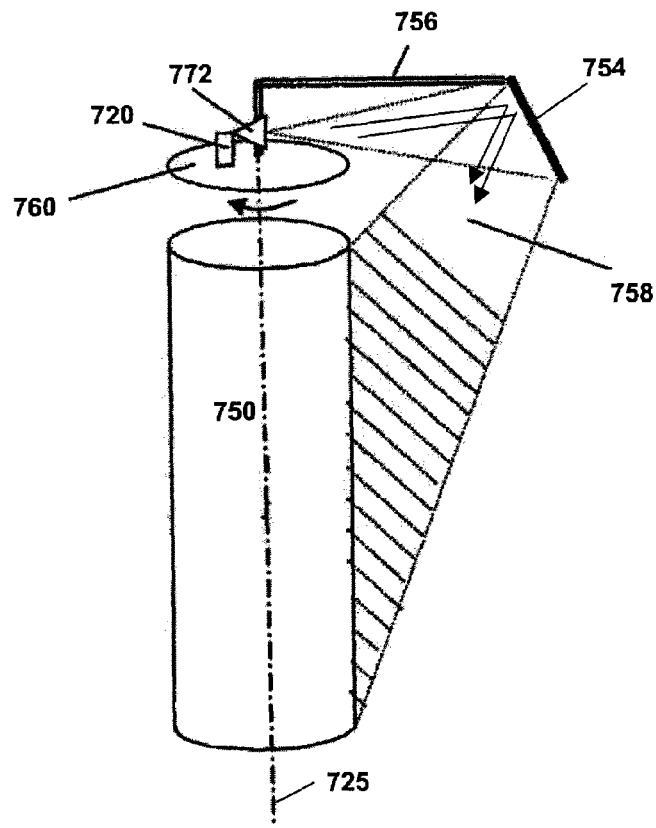
FIG. 7 is an environmental isometric view showing active system data collection apparatus.

FIG. 7 provides a schematic example of an active portal data collection process for an embodiment of the present invention such as may comprise the components described in regard to FIG. 6. An active FMCW radar sensor 720, comprising a single feed horn 722, is mounted on a rotating platform 760 at the top of the portal, typically attached from below to the portal ceiling structure. Alternatively it may be attached to an existing structural element within a facility that can support the mounting and operation of rotating sensors. The reflector, which may be considered by those in the art as an antenna reflector, may be a continuous circular reflector that does not rotate (see FIG. 5A) or, as shown here, a concave antenna reflector 754 as is known to those skilled in the are that, however, is attached to the rotating platform 760 with a mounting arm 756 and maintains a fixed position with respect to the radiating sensor feed horn 722. The MMW signal (indicated by dotted lines) is transmitted from the sensor 720 via the feed horn 722 to the antenna reflector 754, which directs the MMW energy 758 to the subject 790 to be scanned. The subject to be scanned may be a person or an object of interest in an object viewing region, generally indicated in FIG. 7 as object viewing region 750. FIG. 7 also depicts MMW radiation from the active sensor 720 in a sweeping action (see two lines, with arrows, deflecting off reflector 754) Some of the reflected energy is collected by the reflector 754 and sent back to the sensor 720. Thus, the feed horn 722 for the active sensor 720 has both transmission (Tx) and receiving (Rx) functions that are shown in FIG. 6, though this is not meant to be limiting of various embodiments. This provides data for image generation along surfaces of a body, such as a person, under investigation that is positioned in the object viewing region 750. The sensor feed horn 722 performs both the Tx and the Rx feed horn functions. The active sensor can be implemented with a single horn through which transmit and receive functions are done, or with two feed horns, one for transmit and second for receive.

The energy received by the feed horn 722 (and fed to the sensor 720) is down converted, digitized and processed to create the 3D images. Because there is azimuthal and elevation information available after a full scan, there is a complete map of the subject being scanned, subject to the limitations of resolution previously described. One fixed position of the sensor provides 2D data of a segment of a subject. When scanned, however, this data consists of values representing reflected energy for each "pixel" in that 2D space, and from multiple perspectives in 3D space. From this information, an image of the observed 3D field of view can be developed through reconstruction algorithms. These algorithms are designed largely based on the mathematics of the radon transform, statistical knowledge of the data acquisition process and geometry of the data imaging system. In tomography, the filtered back projection algorithm and its variants are the most efficient algorithms currently in use Creating 3D images from a series of coherently collected 2D data is a well-understood problem associated with various types of imaging technology using tomography algorithms. The algorithms are applicable to the people screening problem using a different set of stimulus data (i.e. from a MMW sensor). When combined with passive sensing, which provides a different perspective on the same subject, there is the opportunity through having available, different, information, and to use these multiple results in a synergistic way to increase confidence levels of the detection process. Although the reconstructed 3D images are used for detection of concealed objects, the icons are overlaid on top of 2D profiles to facilitate the operator interpretation. It is noted that in various embodiments only a slight concavity of the antenna reflector is needed to provide suitable transmission of millimeter waves in this system. This is known and calculable to those skilled in the art.

Creating the high-resolution images is only the first step. The challenge is to extract useful information on the desired targets from such imagery. The problem of determining if the target belongs to a class of concealed objects relies upon the amount of information available. Automatic Target Recognition (ATR) algorithms accept pattern vectors from the feature space, and decide the class to which the sensed attributes belong.

Tomography algorithms are typically used to present high resolution images for interpretation by a human (i.e. a doctor) so that a specialist can draw reliable conclusions about what the image is revealing, and plan next steps accordingly. In people screening applications, this approach to image interpretation can be done as well. However, the operator is typically not a MMW specialist, so this would limit how useful the system can be across all applications. Instead, layered on top of tomography algorithms are pattern recognition algorithms, again a mature discipline drawn primarily from biometrics, to support identification of the objects found and provide automated intelligence about the significance of these objects. Real and simulated concealed objects signatures can be collected and stored. The analogous radar problem is the substantial data base developed of radar cross sections that represent different aircraft. For people screening applications, at least three target classifications can be considered: object, explosive, and unknown. The concealed object class may be described by a set of signatures. Therefore, hundreds of profiles may be extracted over the complete rotation of 360 degrees. Three example algorithms that may be implemented in both single and multi-perspective environments. The first is the statistical Naive Bayesian Classifier. It reduces the decision-making problem to simple calculations of feature probabilities. It is based on Bayes' theorem and calculates the posterior probability of classes conditioned on the given unknown feature vector. The second is a rule-based method for classification: K-Nearest Neighbors (K-NN) algorithm. The rule consists of measuring and minimizing the number of K distances from the object to the elements of the training set. The last approach involves Artificial Neural Networks (ANN), where the information contained in the training samples is used to set internal parameters of the network.

Figure 8:
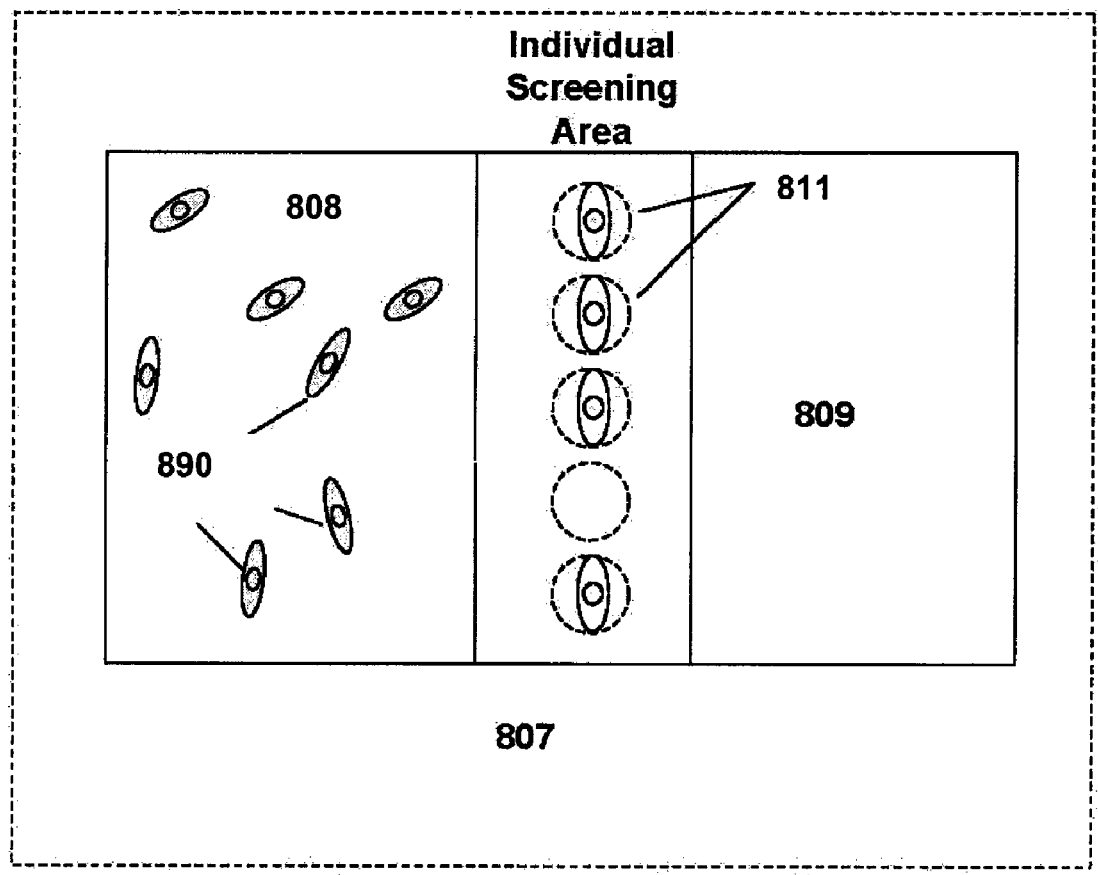
FIG. 8 is an environmental isometric view showing parallel screening methods.

Based on various features of the present invention, which include use of frequencies that do not travel much farther than their designed path distances, embodiments may include parallel screening of many persons at once without a need for heavy structures to block waves from one unit to an adjacent unit of screening. For example, multiple relatively closely spaced screening devices using sub-combinations of the present invention (e.g., sensor and annular or rotating reflector) may be used without each having the structural elements (i.e., roof and wall structures) that are depicted in FIG. 3A. FIG. 8 shows a schematic figure showing the concept of parallel screening, wherein a plurality of screening devices such as described herein (not shown, being positioned above or below the standing spots 811), without roof and wall structures, are arranged in a screening area 807 that separates a non-secure area 808 from a secure area 809. Standing spots 811 are shown on the floor to indicate where persons 890 are to stand while being screened. Suitable green lights or the like indicate a successful screening for each person 890, who can then move to the secure area 809.

It is noted that U.S. Pat. No. 7,135,848 describes a higher level of integration that may be used in passive sensor systems used in embodiments of the present invention. This may further lower overall costs and improve resolution and design flexibility. For example, in some embodiments the technology taught in the referenced patent, incorporated by reference herein, may provide for a passive-only system suited for a number of screening and object detection applications. Also, in terms of secondary sensors (see discussion related to FIG. 5C), arrays of passive sensors using the technology of this patent may be placed in a portal structure in a stationary manner and data from same may be used to supplement data from a rotating active sensor.

All patents, patent applications, patent publications, and other publications referenced herein are hereby incorporated by reference in this application in order to more fully describe the state of the art to which the present invention pertains, to provide such teachings as are generally known to those skilled in the art, and to provide such teachings as are noted through references herein.

While various embodiments of the present invention have been shown and described herein, it will be obvious that such embodiments are provided by way of example only. Numerous variations, changes and substitutions may be made without departing from the invention herein. Moreover, when any range is understood to disclose all values therein and all sub-ranges therein, including any sub-range between any two numerical values within the range, including the endpoints. Accordingly, it is intended that the invention be limited only by the spirit and scope of the appended claims.

What is claimed is:

1. A millimeter-wave (MMW) screening system comprising:
a first rotatable MMW sensor mounted in a structure and on an axis so as to rotate about the axis, the axis extending along an object viewing region scannable by the sensor;
a reflector positioned away from the object viewing region and disposed so as to reflect MMW radiation received from the object viewing region to the sensor; and
a display and processing terminal adapted to receive digital data derived from MMW signals from the first rotatable MMW sensor based on data collection from multiple positions of sensor rotation about the object viewing region, and to process said digital data to provide an image of the object viewing region.

2. The system of claim 1 configured to rotate the sensor 360 degrees about a body under investigation in the object viewing region and detect indicating a presence of objects concealed under clothing, including but not limited to concealed weapons.

3. The MMW screening system of claim 1 wherein the first rotatable MMW sensor comprises an active sensor and the reflector reflects both transmitted millimeter waves (MMWs) from the active sensor and reflected MMWs from the object.

4. The MMW screening system of claim 3 additionally comprising a second, rotatable MMW passive sensor, wherein the display and processing terminal is adapted to process digitized data from both the first and the second MMW sensors to provide displayable image data.

5. The MMW screening system of claim 1 wherein the reflector is mounted in the structure so as to rotate with the first rotatable MMW sensor along the 360 degree path, effective to reflect the MMW radiation from the object to the sensor.

6. A method of screening a person for concealed weapons comprising:

directing the person to stand along the axis of the MMW screening system of claim 3, as the object to be scanned;

rotating the first MMW sensor about the axis to receive MMWs from multiple positions about the person;

processing said digitized MMW data to form a 3D image; detecting the presence of any concealed objects, and displaying an icon over a body profile pinpointing the location of the concealed object on a display in order to protect privacy.

7. The method of claim 6 wherein the sensor is an active sensor that transmits MMWs to the person.

8. The method of claim 6 wherein the active sensor is operating in the MMW frequency region.

9. The method of claim 7 wherein the MMW screening system additionally comprises a second rotatable MMW passive sensor that receives MMWs in the frequency range of 80 to 100 GHz.

10. The method of claim 6 wherein a processor in the display and processing terminal utilizes a tomography algorithm for providing the image, and the image is a three-dimensional image.

* * * * *